United States Patent [19]

Lipsztajn

[11] Patent Number: 5,676,920
[45] Date of Patent: Oct. 14, 1997

[54] CHLORINE DIOXIDE GENERATING PROCESS

[75] Inventor: Marek Lipsztajn, Etobicoke, Canada

[73] Assignee: Sterling Canada, Inc., Houston, Tex.

[21] Appl. No.: 700,110

[22] Filed: Aug. 20, 1996

[51] Int. Cl.⁶ ............................................. C01B 11/02
[52] U.S. Cl. ................................. 423/478; 423/477
[58] Field of Search ................................ 423/478, 477

[56] References Cited

U.S. PATENT DOCUMENTS

| | | | |
|---|---|---|---|
| 2,332,181 | 10/1943 | Soule | 423/478 |
| 2,489,572 | 11/1949 | Hampel | 423/478 |
| 2,833,624 | 5/1958 | Sprauer | 423/478 |
| 2,863,722 | 12/1958 | Rapson | 423/478 |
| 3,975,505 | 8/1976 | Fuller | 423/478 |
| 4,081,520 | 3/1978 | Swindells et al. | 423/478 |
| 4,086,328 | 4/1978 | SAwindells | 423/478 |
| 4,465,658 | 8/1984 | Fredette | 423/478 |
| 4,473,540 | 9/1984 | Fredette | 423/478 |
| 4,578,261 | 3/1986 | Lobley | 423/478 |
| 5,091,167 | 2/1992 | Engström et al. | 423/478 |
| 5,322,598 | 6/1994 | Caulfield et al. | 423/478 |
| 5,342,601 | 8/1994 | Caufield et al. | 423/478 |

FOREIGN PATENT DOCUMENTS 0535113  9/1995  European Pat. Off. .

*Primary Examiner*—Ngoc-Yen Nguyen
*Attorney, Agent, or Firm*—Sim & McBurney

[57] ABSTRACT

Chlorine dioxide is produced by reaction of sodium chlorate, a reducing agent, preferably methanol or hydrogen peroxide, and sulfuric acid at the boiling point of the reaction medium under a subatmospheric pressure. Present in the reaction medium is a component which suppresses the solubility of by-product sodium sulfate and thereby increases the concentration of free hydrogen ions in the reaction medium available for reaction to form chlorine dioxide. The solubility-depressing component generally is an inert alkali metal salt, preferably an inert sodium salt, such as perchlorate or nitrate. By increasing the concentration of hydrogen ions available for reaction, it is possible to achieve an improvement in the rate of production of chlorine dioxide.

20 Claims, No Drawings

CHLORINE DIOXIDE GENERATING PROCESS

FIELD OF INVENTION

The present invention relates to the production of chlorine dioxide by the reaction of sodium chlorate, a reducing agent and sulfuric acid.

BACKGROUND TO THE INVENTION

In U.S. Pat. No. 4,081,520, assigned to the assignee hereof and the disclosure of which is incorporated herein by reference, there is described a process for the formation of chlorine dioxide at high efficiency by reducing sodium chlorate with methanol in a sulfuric acid-containing reaction medium which is maintained at its boiling point under a subatmospheric pressure. Chlorine dioxide is removed from the reaction zone in admixture with steam and by-product sodium sulfate precipitates from the reaction medium and is removed from the reaction zone. The process is carried out at a total acid normality of at least about 9 normal.

In U.S. Pat. No. 4,473,540, also assigned to the assignee hereof and the disclosure of which is incorporated herein by reference, the process is described as being effected at a total acid normality below 9 and down to about 7 normal. European Patent No. 0 535 113 (E199), also assigned to the assignee hereof and the disclosure of which is incorporated herein by reference, describes the process as being effected at a total acid normality below about 7 normal and at least about 5 normal. To maintain a high level of efficiency of chlorine dioxide production, at least about 90% and preferably at least about 95% at commercially-acceptable production rates at such lower total acid normality values requires a concentration of sodium chlorate of at least about 2 molar.

The generation rate for the production of chlorine dioxide is very slow at total acid normalities below about 5 normal, so that it currently is not practical to operate under such conditions. It has been reported in the literature that a process involving hydrogen peroxide as reducing agent is somewhat faster than the methanol process at such acidities. However, the process is still significantly slower than the process carried out at higher acidities. This slow production rate is believed to arise from the relatively small number of free hydrogen ions in the reaction medium available for the chlorine dioxide generating reaction.

Hydrogen ions in the reaction medium form bisulfate ions with the sulfate ions from the sulfuric acid and in this way are removed from availability for reaction. This effect can be counteracted to some extent by employing higher concentrations of sodium chlorate, which has a positive effect on the chlorine dioxide generation rate. However, this possibility is limited by a tendency for periodic random loss of production of chlorine dioxide ("white-out") to occur at high sodium chlorate concentrations and also by the increased losses of coprecipitated sodium chlorate in the saltcake filtration step.

SUMMARY OF INVENTION

In accordance with the present invention, there is provided an improvement in a process for the production of chlorine dioxide, which comprises reducing sodium chlorate with a reducing agent, preferably methanol or hydrogen peroxide, in an aqueous reaction medium containing sulfuric acid in a reaction zone, maintaining the reaction medium at its boiling point while a subatmospheric pressure is applied thereto, removing chlorine dioxide from the reaction zone in gaseous admixture with steam, depositing a by-product sodium sulfate in the reaction zone, and removing the deposited sodium sulfate from the reaction zone.

The improvement in this process provided by the present invention is having present in the reaction medium of at least one alkali metal salt which is inert in the reduction reaction.

The suppression of the solubility of the sodium sulfate by the inert alkali metal salt, usually a sodium salt, present in the reaction medium is believed to result in less free hydrogen ions being removed from the reaction medium as bisulfate ions and hence more free hydrogen ions remaining available to react with sodium chlorate and a reducing agent, such as methanol or hydrogen peroxide, to produce chlorine dioxide.

Another advantage of the inert salt additive is the possibility of independently varying chlorate concentration and acidity, to result in more degrees of freedom in manipulating the chlorine dioxide generating process.

Suppression of the solubility of the sodium sulfate by-product by the presence of the inert sodium salt represents one embodiment of a generic process in which an inert component is present in the reaction medium which suppresses the sodium sulfate solubility and which thereby enhances the availability of free hydrogen ions for reaction to form chlorine dioxide. For example, a mixed solvent or non-aqueous solvent, preferably a Lewis acid with a high boiling point, may be used.

The term "inert alkali metal salt" or "inert sodium salt" used herein means respectively an alkali metal salt or a sodium salt which does not react with a reducing agent for the sodium chlorate and has no buffering properties towards hydrogen ions.

While an enhancement of the production of chlorine dioxide by an inert sodium salt or other alkali metal salt additive can be preferably achieved in a process using methanol or hydrogen peroxide as a reducing agent, it also is possible to utilize the same approach in processes involving other reducing agents, for example, oxalic acid, sulfur dioxide, chloride ion, formaldehyde, formic acid, ethanol, etc. Combinations of reducing agents also may be employed. For example, methanol or hydrogen peroxide addition as reducing agents can be combined with chloride ion addition as an additional reducing agent.

Furthermore, since the reduction of chlorate with added chloride ion in the aqueous acid reaction medium results in the formation of chlorine by-product, it is beneficial to remove this by-product by reacting the chlorine with a reducing agent, such as sulfur dioxide, hydrogen peroxide or formic acid. The resulting acidic mixture containing chloride ions may be recirculated to the chlorine dioxide generator or reused elsewhere.

GENERAL DESCRIPTION OF INVENTION

Any desired alkali metal salt, preferably a sodium salt which is inert in the chlorine dioxide-generating reaction medium may be employed in the present invention, such as sodium perchlorate and sodium nitrate. While a single inert sodium salt generally is used, mixtures of two or more of such salts may be employed.

A single initial charge of such inert sodium salt to the reaction medium usually is sufficient, with the inert sodium salt remaining indefinitely in the reaction medium, with any losses resulting from co-precipitation from the reaction medium being made-up by adding further quantities of the inert sodium salts, as required.

It is also possible to maintain a continuous feed of the inert salt to compensate for possible losses which may occur, for example, in the saltcake filtration step. The inert alkali metal salt, such as sodium perchlorate or potassium perchlorate, may be added separately from or in combination with the sodium chlorate feed. The feed of inert alkali metal salt also may be combined with the feed of acid or the feed of reducing agent.

A combined feed of sodium chlorate and alkali metal perchlorate may be beneficial, particularly when the alkali metal perchlorate, such as sodium or potassium perchlorate, constitutes a by-product formed in the sodium chlorate manufacturing process.

The quantity of such inert alkali metal salt, preferably inert sodium salt, may vary widely from low levels of addition up to saturation of the reaction medium under the prevailing reaction conditions. Generally, the concentration of such inert salt may vary from about 0.05 to about 10 molar, preferably about 0.5 to about 5 molar. There also may be employed in the present invention mixtures of the inert alkali metal salt and a corresponding acid, for example, a mixture of sodium or potassium perchlorate and perchloric acid.

The process of the invention may be operated over a wide range of acidity, generally from about 2 to about 11 normal, for example, from about 7 to about 11 normal or from about 5 to about 7 normal. However, the invention has particular utility at lower acid normality values, typically below about 5 normal.

It is preferred, therefore, to effect the process at about 2 to about 5 normal. Such low acid normality values are desirable since, not only is the possibility of corrosion decreased but also the sodium sulfate by-product may be obtained in neutral anhydrous form.

The concentration of sodium chlorate in the reaction medium may vary widely, generally from about 0.5M to saturation of the reaction medium but not sufficiently high that a potential white-out or chlorate coprecipitation conditions are created. Preferably, the sodium chlorate concentration is above about 1 molar and below about 6 molar, the actual range of particularly useful chlorate concentrations depending on total acid normality of the reaction medium, inert salt concentration and the type of reducing agent employed. Mixtures of sodium chlorate and chloric acid also may be used to provide the desired chlorate ion concentration. However, because of the presence of the charge of inert sodium salt or other inert alkali metal salt, the chlorine dioxide generating process is less sensitive to differences in chlorate concentration with changing total acid normality than is the case when such inert sodium salt or other alkali metal salt is absent.

The reaction medium may be maintained at any desired temperature to effect the reaction, generally at least about 60° C. but not greater than the temperature above which substantial decomposition of chlorine dioxide occurs, preferably about 65° to about 85° C.

The reaction zone in which the chlorine dioxide-generating reaction medium is located is maintained under a subatmospheric pressure to provide the reaction medium at its boiling point. The subatmospheric pressure generally ranges from about 50 to about 300 mm Hg, preferably about 100 to about 200 mm Hg.

Chlorine dioxide is spontaneously explosive at high partial pressures. Accordingly, it may be beneficial to provide an air purge to the reaction zone, if required, to provide a partial pressure of chlorine dioxide in the gaseous mixture removed from the reaction zone below about 100 mm Hg.

The rate of production of chlorine dioxide from the reaction medium may be enhanced further, particularly at lower acid normality values, below about 5 normal, by the utilization of at least one rate-enhancing catalyst. For example, U.S. Pat. No. 5,002,746 describes catalytic ionic species which may be employed.

EXAMPLE

The Example illustrates the generation of chlorine dioxide in accordance with the present invention.

An experimental run was effected using a chlorine dioxide generator liquor composed of 4.02N sulfuric acid, 3.3M sodium chlorate and 2.5M sodium perchlorate with a continuous feed of methanol, sulfuric acid and sodium chlorate. The generator liquor had a temperature of about 70° C. and a subatmospheric pressure of about 125 mm Hg applied to the generator to retain the generator liquor at its boiling point. A very pure chlorine dioxide product was obtained with a chemical efficiency of 97% and a production rate of 0.5 lb of chlorine dioxide per hour per U.S. gallon.

A comparative run carried out without the addition of the sodium perchlorate, i.e. the inert salt, resulted in an approximately one order of magnitude decrease in the production rate. These experiments demonstrate the significant effect of the presence of the inert salt on the production rate of chlorine dioxide.

SUMMARY OF DISCLOSURE

In summary of this disclosure, the present invention provides a novel chlorine dioxide generating process based on the reaction of sodium chlorate, a reducing agent, preferably methanol or hydrogen peroxide and sulfuric acid, wherein the reaction rate is increased by the presence of at least one inert solubility suppressing additive, such as an inert alkali metal salt, preferably a sodium salt, so as to enhance the availability of free hydrogen ions for reaction. Modifications are possible within the scope of this invention.

What we claim is:

1. In a process for the production of chlorine dioxide, which comprises reducing sodium chlorate with a reducing agent in an aqueous acid reaction medium containing sulfuric acid in a reaction zone, maintaining the reaction medium at its boiling point while a subatmospheric pressure is applied thereto, removing chlorine dioxide from the reaction zone in gaseous admixture with steam, depositing a by-product sodium sulfate in the reaction zone, and removing the deposited sodium sulfate from the reaction zone, the improvement which comprises:
having present in the reaction medium at least one alkali metal salt which is inert in the reduction reaction before reducing the sodium chlorate.

2. The process of claim 1 wherein said inert alkali metal salt is an inert sodium salt.

3. The process of claim 1 wherein said inert alkali metal salt is an inert potassium salt.

4. The process of claim 2 wherein said sodium salt is at least one of sodium perchlorate and sodium nitrate.

5. The process of claim 3 wherein said potassium salt is potassium perchlorate.

6. The process of claim 1 wherein said at least one inert alkali metal said is present in the reaction medium by effecting an initial charge of inert alkali metal salt to the reaction medium.

7. The process of claim 1 wherein said at least one inert alkali metal salt is present in the reaction medium in a concentration of about 0.05 to about 10 molar.

8. The process of claim 5 wherein the concentration of said at least one inert alkali metal salt is about 0.5 to about 5 molar.

9. The process of claim 1 wherein said aqueous acid reaction medium has an acid normality of below about 5N.

10. The process of claim 9 wherein said aqueous acid reaction medium has an acid normality of from about 2 to about 5N.

11. The process of claim 1 wherein the concentration of chlorate ions in the aqueous acid reaction medium is at least about 0.5 molar.

12. The process of claim 1 wherein the concentration of chlorate ions in the aqueous acid reaction medium is from about 1 to about 6 molar.

13. The process of claim 1 wherein said at least one inert alkali metal salt is present in the reaction medium by effecting a continuous feed of said inert alkali metal salt.

14. The process of claim 13 wherein said at least one inert alkali metal salt constitutes a by-product formed in a sodium chlorate manufacturing process.

15. The process of claim 13 wherein a combined feed of said at least one inert alkali metal salt and sodium chlorate is effected.

16. The process of claim 1 wherein, in addition to said at least one inert alkali metal salt, a corresponding acid is also incorporated into the reaction medium.

17. The process of claim 16 wherein the said at least one inert alkali metal salt is selected from sodium perchlorate, potassium perchlorate and mixtures thereof and the corresponding acid is perchloric acid.

18. The process of claim 1 wherein said reducing agent is methanol.

19. The process of claim 1 wherein said reducing agent is hydrogen peroxide.

20. The process of claim 1 wherein said reducing agent is chloride ion.

* * * * *